US011764562B2

(12) United States Patent
Wu et al.

(10) Patent No.: US 11,764,562 B2
(45) Date of Patent: Sep. 19, 2023

(54) TERMINAL STRUCTURE FOR CONDUCTION COOLING HIGH TEMPERATURE SUPERCONDUCTING CABLE

(71) Applicants: CHINA THREE GORGES CORPORATION, Hubei (CN); XIDIAN UNIVERSITY, Shaanxi (CN)

(72) Inventors: Yunyi Wu, Wuhan (CN); Likun Yin, Wuhan (CN); Qian Gong, Wuhan (CN); Yong Yang, Wuhan (CN); Yujia Zhu, Wuhan (CN)

(73) Assignees: CHINA THREE GORGES CORPORATION, Wuhan (CN); XIDIAN UNIVERSITY, Xi'an (CN)

( * ) Notice: Subject to any disclaimer, the term of this patent is extended or adjusted under 35 U.S.C. 154(b) by 0 days.

(21) Appl. No.: 17/879,309

(22) Filed: Aug. 2, 2022

(65) Prior Publication Data
US 2023/0261458 A1 Aug. 17, 2023

(30) Foreign Application Priority Data
Feb. 16, 2022 (CN) .......................... 202210139580.7

(51) Int. Cl.
*H01B 12/00* (2006.01)
*H02G 15/34* (2006.01)
*F25D 19/00* (2006.01)

(52) U.S. Cl.
CPC ........... *H02G 15/34* (2013.01); *F25D 19/006* (2013.01)

(58) Field of Classification Search
CPC .......... F17C 2203/03; F17C 2203/0643; F17C 2221/012; F17C 2221/014;
(Continued)

(56) References Cited

U.S. PATENT DOCUMENTS

2008/0119362 A1  5/2008 Ashibe
2021/0065945 A1  3/2021 Ma

FOREIGN PATENT DOCUMENTS

CN  102637482 A  * 8/2012  ............. Y02E 40/60
CN  204010879 U   12/2014
(Continued)

*Primary Examiner* — Timothy J Thompson
*Assistant Examiner* — Guillermo J Egoavil
(74) *Attorney, Agent, or Firm* — Maschoff Brennan (57) ABSTRACT

The present application discloses a terminal structure for conduction cooling high temperature superconducting cable, comprising: a cable terminal body; a terminal thermal insulation shell, in which a vacuum thermal insulation cavity is formed, and the cable terminal body being arranged in the vacuum thermal insulation cavity; a refrigeration mechanism comprising a refrigeration output part extending into the vacuum thermal insulation cavity, and the refrigeration output part being connected to the cable terminal body through a cooling-conducting structure. The terminal structure provided by the present application cools the high-temperature superconducting cable by means of conduction cooling of a refrigerator without operations of low-temperature liquid transportation and supplementary, and can operate for a long time without regular maintenance, reduce the heat leakage of the cable terminal, improve the utilization efficiency of the cooling capacity of the refrigerator, and effectively ensure the stable operation of the cable for a long time.

12 Claims, 7 Drawing Sheets

(58) Field of Classification Search
CPC .......... F17C 2221/016; F17C 2221/017; F17C 2223/0161; F17C 3/085; F25D 19/006; H01B 12/00; H01B 12/16; H01F 6/00; H01F 6/006; H01F 6/06; H01F 6/04; H01F 6/065; H01G 15/34; H01L 39/00; H01L 39/24; H01R 4/68; H01R 11/32; Y02E 40/60; Y02E 60/32
USPC ...... 505/211, 220, 230; 174/125.1, 15.5, 50; 62/51.1
See application file for complete search history.

(56) References Cited

FOREIGN PATENT DOCUMENTS

| | | | | | |
|---|---|---|---|---|---|
| CN | 105047303 | A | | 11/2015 | |
| CN | 209860161 | U | | 12/2019 | |
| CN | 211346003 | U | | 8/2020 | |
| CN | 114204513 | A | * | 3/2022 | ............. H02G 15/34 |
| CN | 114464366 | A | * | 5/2022 | ............. H01B 12/14 |
| JP | 2019129583 | A | * | 8/2019 | ............. Y02E 40/60 |
| JP | 2019179781 | A | | 10/2019 | |

\* cited by examiner

TERMINAL STRUCTURE FOR CONDUCTION COOLING HIGH TEMPERATURE SUPERCONDUCTING CABLE

CROSS-REFERENCE TO RELATED APPLICATIONS

This application claims priority benefits to Chinese Patent Application No. 202210139580.7, filed Feb. 16, 2022, the contents of which are incorporated herein by reference.

TECHNICAL FIELD

The application relates to the application field of superconducting power technology, in particular to a terminal structure for conduction cooling high temperature superconducting cable.

BACKGROUND

High temperature superconducting cables processed from high temperature superconducting materials can transmit current density at least two orders of magnitude higher than conventional cables under the same structural size. The application of high-temperature superconducting cables to the power grid can greatly improve the power transmission of the power grid, which has important application value for the upgrade of the existing power system. For high-temperature superconducting cables, in principle, its total operating loss should be close to or slightly larger than that of conventional cables, so as to achieve a certain level of economy. However, the largest operating loss of existing high temperature superconducting cables is energy consumed to cool the cable below the critical temperature.

In most of the existing superconducting cable projects, immersion cooling in low temperature liquid to make the high temperature superconducting cable reach the working temperature, such as the superconducting cable cooling system disclosed in the patent under application number 201921738147.5, the superconducting cable cooling system includes a refrigeration circuit and a cooling circuit; the refrigeration circuit includes at least one refrigerator, a liquid nitrogen container connected to the refrigerator, and a first cryopump provided between the refrigerator and the liquid nitrogen container; the cooling circuit includes a heat exchanger, a second cryopump, and a cryogenic container for placing superconducting cables and liquid nitrogen connected in sequence; the heat exchanger is provided in the liquid nitrogen container.

In the superconducting cable cooling system disclosed in the above-mentioned application, the refrigerator cools the liquid nitrogen, so that the liquid nitrogen reaches a supercooled state to cool the superconducting cable. The cooling method of making the superconducting cable reach the working temperature by immersion cooling in low temperature liquid nitrogen is not only complicated in structure, high in cost, but also requires regular maintenance, and is very inconvenient to replenish and replace liquid nitrogen.

SUMMARY

Therefore, the technical problem to be solved by the present application is the problem existing in the prior art that the cooling method of making the superconducting cable reach the working temperature by immersion cooling in low temperature liquid nitrogen is not only complicated in structure and high in cost, but also requires regular maintenance, and is very inconvenient to replenish and replace liquid nitrogen, so a terminal structure for cooling the high temperature superconducting cable by conduction cooling is provided.

In order to achieve the above mentioned objective, a terminal structure for conduction cooling high temperature superconducting cable is provided in an embodiment of the present application, the terminal structure comprises:

a cable terminal body;

a terminal thermal insulation shell, in which a vacuum thermal insulation cavity is formed, and the cable terminal body being arranged in the vacuum thermal insulation cavity;

a refrigeration mechanism comprising a refrigeration output part extending into the vacuum thermal insulation cavity, and the refrigeration output part being connected to the cable terminal body through a cooling-conducting structure.

Optionally, the refrigeration mechanism comprises a refrigerator.

The refrigeration output part is a cold head of the refrigerator, and the cooling-conducting structure is a cooling-conducting belt connected between the cold head of the refrigerator and the cable terminal body.

Optionally, the bottom of the terminal thermal insulation shell is provided with an installation sleeve for receiving and installing the cold head of the refrigerator.

The cold head of the refrigerator is installed in the installation sleeve in a sealed manner, and extends into the vacuum thermal insulation cavity from the installation sleeve to be connected to the cooling-conducting belt.

Optionally, the terminal thermal insulation shell is a multi-layer thermal insulation structure, and the terminal thermal insulation shell at least comprises:

A metal shell layer arranged to be internally evacuated;

A low temperature radiation protection layer, which is arranged in the metal shell layer and is suitable for separating the metal shell layer and the cable terminal body to reduce heat radiation.

Optionally, the terminal thermal insulation shell comprises:

a low temperature radiation protection layer bracket, which is arranged between the low temperature radiation protection layer and the metal shell layer, and is suitable for supporting the low temperature radiation protection layer in the metal shell layer to set a spaced position.

Optionally, the low temperature radiation protection layer bracket comprises one or more separation rings arranged between the metal shell layer and the low temperature radiation protection layer, and the separation rings are polyvinyl chloride plastic rings.

Optionally, the metal shell layer is provided with a process hole for installing and debugging cables, and a process hole cover plate for opening or closing the process hole.

Optionally, an avoidance opening is provided on the low temperature radiation protection layer at a position corresponding to the process hole.

The low-temperature radiation protection layer comprises an upper cover body radiation protection layer which can open or close the avoidance opening, and a handle is provided on the upper cover body radiation protection layer.

Optionally, the terminal thermal insulation shell comprises a cylindrical body, and a cable connection end and an electrical equipment connection end both disposed at both ends of the cylindrical body.

A terminal cavity is formed in the cable connection end, the terminal structure further comprises a terminal bracket arranged in the terminal cavity, and the cable terminal body is installed in the terminal thermal insulation shell through the terminal bracket.

Optionally, the cable connection end comprises a uniform diameter section with a reduced inner diameter, and a variable diameter section connected between the uniform diameter section and the cylindrical body.

The terminal bracket comprises a cylindrical bracket body part and a conical bracket body part fitted with the uniform diameter section and the variable diameter section respectively, a plurality of support snap rings for supporting and fixing the cable terminal body are provided spaced apart in the terminal bracket along an axial direction of the terminal bracket.

Optionally, the cable terminal body comprises a cable body and a cable joint.

The cooling-conducting structure is a cooling-conducting belt connected between the refrigeration output part and the cable joint and/or the cable body. The cable joint and the electrical equipment connection end are connected by a current lead.

Optionally, the electrical equipment connection end comprises:

a connecting plate detachably fixed on the end opening of the cylindrical body;

a terminal post, which is arranged on the connecting plate, and the terminal post comprises an inner terminal end located on an inner side of the connecting plate and an outer terminal end located on an outer side of the connecting plate;

The inner terminal end is suitable for connecting to the cable joint, and the outer terminal end is suitable for connecting to electrical equipment.

Optionally, the connecting plate is a metal plate, and a connecting plate radiation protection screen is arranged on the inner side of the connecting plate, and a connecting plate radiation protection screen is blocked, in a sealed manner, between the vacuum thermal insulation cavity and the connecting plate.

Optionally, the terminal structure for conduction cooling high temperature superconducting cable further comprises:

a cable body thermal insulation sleeve connected to the terminal thermal insulation shell in a sealed manner;

a cable support, through which the cable body is supported and fixed in the cable body thermal insulation sleeve.

When compared with the prior art, the technical solution of the present application has the following advantages:

1. A terminal structure for conduction cooling high temperature superconducting cable is provided in an embodiment of the present application, the terminal structure comprises: a cable terminal body; a terminal thermal insulation shell and a refrigeration mechanism. A vacuum thermal insulation cavity is formed in the terminal thermal insulation shell and the cable terminal body is arranged in the vacuum thermal insulation cavity; the refrigeration mechanism comprises a refrigeration output part extending into the vacuum thermal insulation cavity, and the refrigeration output part is connected to the cable terminal body through a cooling-conducting structure.

In this way, the cooling capacity generated by the refrigeration mechanism is output from the refrigeration output part, and then is transmitted to the cable terminal body through the cooling-conducting structure, so as to realize the cooling of the high temperature superconducting cable by means of conduction cooling, without operations of low temperature liquid transportation and supplementary, and the high temperature superconducting cable can operate in a long-term and does not require regular maintenance, and the terminal thermal insulation shell can be provided to greatly reduce the heat leakage of the cable terminal, improve the utilization efficiency of the cooling capacity of the refrigerator, and effectively ensure the long-term stable operation of the cable. Moreover, the terminal structure provided by the embodiment of the present application has a compact and simple overall structure, and is low in cost and suitable for use and promotion.

2. The terminal thermal insulation shell in an embodiment of the present application is a multi-layer thermal insulation structure, and the low temperature radiation protection layer arranged in the metal shell layer can separate the normal temperature metal shell layer from the low temperature cable terminal body, effectively reduce the heat loss between the cable terminal body and the outside world such as conduction heat, radiant heat, convection heat dissipation, etc., makes full use of the cooling capacity of the refrigerator to reduce the influence of heat leakage and heat by energization on the high temperature superconducting cable, thereby further improving the reliability of the superconducting cable.

3. In an embodiment of the present application, the low temperature radiation protection layer and the metal shell layer are separated by the separation rings arranged between the metal shell layer and the low temperature radiation protection layer, and the separation rings are polyvinyl chloride plastic rings, which can effectively avoid the heat conduction caused by the direct contact between the low temperature radiation protection layer and the metal shell layer, reduce conduction heat leakage, and reduce heat loss.

4. In an embodiment of the present application, it is convenient to install and repair cables by the process hole and process hole cover plate provided on the metal shell layer. An avoidance opening is provided on the low temperature radiation protection layer at a position corresponding to the process hole and an upper cover body radiation protection layer which is able to open or close the avoidance opening is provided. In this way, it can effectively prevent the loss of cooling capacity in the vacuum thermal insulation cavity while facilitating installation and maintenance operations. Meanwhile, a handle is also arranged on the upper cover body radiation protection layer, which further improves the convenience of operation.

5. In an embodiment of the present application, the terminal thermal insulation shell comprises a cylindrical body, and a cable connection end and an electrical equipment connection end both disposed at both ends of the cylindrical body, and a terminal bracket is arranged in the terminal cavity, both the process hole and the installation sleeve for accommodating the cold head of the refrigerator are arranged on the cylindrical body, which reasonably allocates the position of each part of the structure in the vacuum thermal insulation cavity, so that enough installation and debugging operation space is reserved in the terminal thermal insulation shell, and the installation and maintenance of cables is more convenient and efficient.

6. In an embodiment of the present application, the electrical equipment connection end comprises a connecting plate detachably fixed on the end opening of the cylindrical body, the detachably arrangement of the connecting plate facilitates the installation of elements such as terminal post and vacuum airtight aviation plugs on the connecting plate. In addition, a connecting plate radiation protection screen is arranged on the inner side of the connecting plate in the present application, and the connecting plate radiation protection screen is blocked, in a sealed manner, between the vacuum thermal insulation cavity and the connecting plate, so that a thermal radiation protection for the electrical equipment connection end can be effectively formed.

BRIEF DESCRIPTION OF THE DRAWINGS

In order to more clearly illustrate the detailed description of the present application or the technical solutions in the prior art, the following will briefly introduce the drawings required in the detailed description or the prior art. Obviously, the drawings in the following description are some embodiments of the present application. For an ordinary worker in the art, other drawings can also be obtained from these drawings without expenditure of any creative labor.

LIST OF REFERENCE NUMBERS 1. cable terminal body; 11. cable body; 12. cable joint; 13. current lead;
2. terminal thermal insulation shell;
21. metal shell layer; 211. installation sleeve; 212. process hole; 213. process hole cover plate;
22. low-temperature radiation protection layer; 221. upper cover body radiation protection layer; 2211. handle; 222. radiation protection layer of cable connection end; 223. radiation protection layer of central cavity; 224. radiation protection layer of electrical equipment connection end; 225. radiation protection layer of cold head of the refrigerator;
23. low temperature radiation protection layer bracket; 231 separation ring;
2a. cylindrical body;
2b. cable connection end; 2b1. second connection flange;
2c. electrical equipment connection end;
2c1. connecting plate; 2c11. installation hole; 2c12. bolt connection hole;
2c2. terminal post; 2c21. inner terminal end; 2c22. outer terminal end;
2c3. connecting plate radiation protection screen; 2c31. avoidance installation hole; 2c32. connection support column;
3. cold head of the refrigerator;
4. cooling-conducting structure;
5. terminal bracket; 51. support snap rings;
6. cable body thermal insulation sleeve; 61. first connection flange;
7. cable support;
8. avoidance opening;
9. refrigeration mechanism;
10. refrigerator.

DETAILED DESCRIPTION

The technical solutions of the present application will be clearly and completely described below with reference to the drawings. Obviously, the described embodiments are part of the embodiments of the present application, but not all of the embodiments. All other embodiments obtained by an ordinary worker in the art based on the embodiments of the present application without expenditure of creative labor fall within the protection scope of the present application.

In the description of the present application, it should be noted that orientation or positional relationship indicated by the terms "center", "upper", "lower", "left", "right", "vertical", "horizontal", "inner", "outer", etc. is based on the orientation or positional relationship shown in the drawings, which is only for the convenience of describing the present application and simplifying the description, rather than indicating or implying that the indicated device or element must have a specific orientation or be constructed and operated in a specific orientation, and therefore should not be understood as limiting the present application. Furthermore, the terms "first", "second", and "third" are used for descriptive purposes only and should not be understood to indicate or imply relative importance.

In the description of the present application, it should be noted that the terms "installed", "connected" and "connection" should be understood in a broad sense, unless otherwise expressly specified and limited, for example, it may be a fixed connection or a detachable connection, or integral connection; it can be a mechanical connection or an electrical connection; it can be a direct connection or an indirect connection through an intermediate medium, or it can be the internal connection of two elements, which can be a wireless connection or a wired connection. For an ordinary worker in the art, the specific meanings of the above terms in the present application can be understood in specific situations.

Furthermore, the technical features involved in the different embodiments of the present application described below can be combined with each other as long as they do not conflict with each other.

Embodiment 1

As shown in FIGS. 1 to 7, a terminal structure for conduction cooling high temperature superconducting cable is provided in an embodiment of the present application. The terminal structure for conduction cooling high temperature superconducting cable comprises: a cable terminal body 1, a terminal thermal insulation shell 2 and refrigeration mechanism 9.

Specifically, a vacuum thermal insulation cavity is formed in terminal thermal insulation shell 2, and the cable terminal body 1 is arranged in the vacuum thermal insulation cavity. The refrigeration mechanism 9 comprises a refrigeration output part extending into the vacuum thermal insulation cavity, and the refrigeration output part is connected to the cable terminal body 1 through a cooling-conducting structure 4.

In this way, the cooling capacity generated by the refrigeration mechanism 9 is output from the refrigeration output part, and then is transmitted to the cable terminal body 1 through the cooling-conducting structure 4, so as to realize the cooling of the high temperature superconducting cable by means of conduction cooling, without operations of low temperature liquid transportation and supplementary, and can operate in a long-term and does not require regular maintenance, and the terminal thermal insulation shell 2 can be provided to greatly reduce the heat leakage of the cable terminal, improve the utilization efficiency of the cooling capacity of the refrigerator, and effectively ensure the long-term stable operation of the cable.

Figure 1:
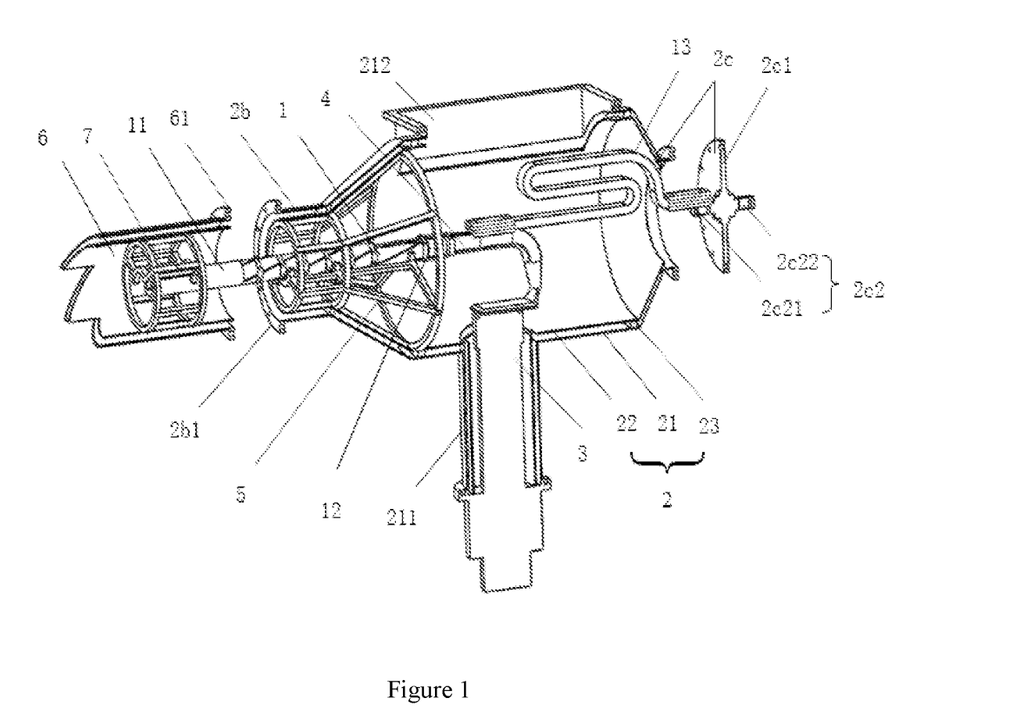
FIG. 1 is a structural cross-sectional view of a terminal structure for conduction cooling high temperature superconducting cable in an embodiment of the present application at one angle.
Figure 2:
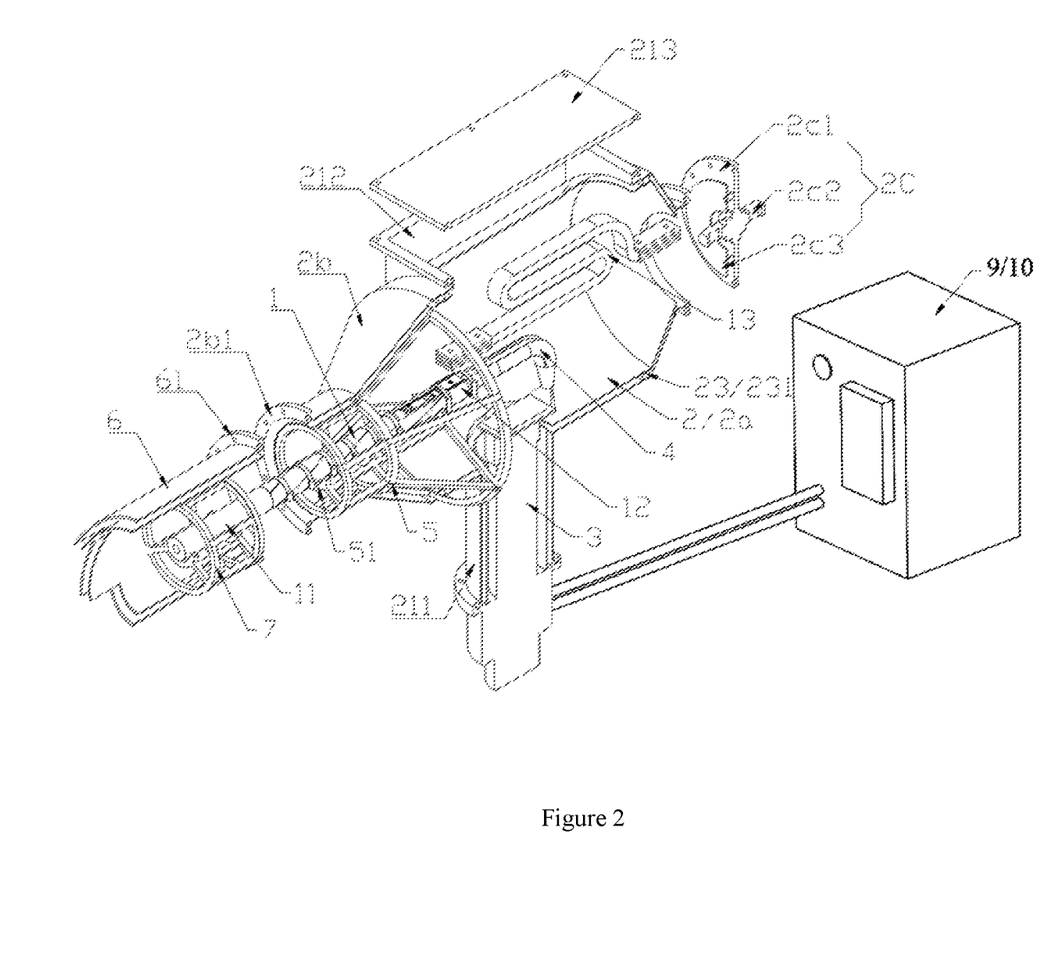
FIG. 2 is another structural cross-sectional view of a terminal structure for conduction cooling high temperature superconducting cable in an embodiment of the present application.

Optionally, the refrigeration mechanism 9 comprises a refrigerator 10; the refrigeration output part is a cold head 3 of the refrigerator, and the cooling-conducting structure 4 is a cooling-conducting belt connected between the cold head 3 of the refrigerator and the cable terminal body 1. The connection between the cold head 3 of the refrigerator and the body of the cable terminal 1 is more convenient by using the cooling-conducting tape as the cooling-conducting structure 4, since the cooling-conducting belt has certain bending and stretching properties. Of course, in the embodiment of the present application, the cooling-conducting structure 4 is not limited to a cooling-conducting belt, and a structure such as a cooling-conducting pipe may also be used.

Optionally, in an embodiment of the present application, the cooling-conducting belt can be a copper braided belt. A copper tube is rolled and a hole is made at the connection position of the cooling-conducting belt and the cold head 3 of the refrigerator, and the cooling-conducting belt is connected to the cold head 3 of the refrigerator through a bolt.

Optionally, in an embodiment of the present application, a hoop can be used to tightly fix the cable terminal body 1 and the cooling-conducting belt.

Optionally, in an embodiment of the present application, the bottom of the terminal thermal insulation shell 2 is provided with an installation sleeve 211 for receiving and installing the cold head 3 of the refrigerator; the cold head 3 of the refrigerator is installed in the installation sleeve 211 in a sealed manner, and extends into the vacuum thermal insulation cavity from the installation sleeve 211 to be connected to the cooling-conducting belt.

Optionally, in an embodiment of the present application, the end of the cold head 3 of the refrigerator extends into the vacuum thermal insulation cavity, an annular boss is provided on the cold head 3 of the refrigerator in a circumferential direction, and the lower periphery of the installation sleeve 211 is provided with an annular flange. The annular boss is in contact with the annular flange and is fixed by screw connection.

Optionally, a sealing ring is arranged between the annular boss and the annular flange, so as to effectively avoid heat leakage in the connection gap between the annular boss and the annular flange, prevent the loss of cooling capacity, and improve the utilization efficiency of the cooling capacity of the refrigerator.

Optionally, the terminal thermal insulation shell is a multi-layer thermal insulation structure. the terminal thermal insulation shell at least comprises a metal shell layer 21 and a low temperature radiation protection layer 22. The low temperature radiation protection layer 22 is arranged in the metal shell layer 21 and is suitable for separating the metal shell layer 21 and the cable terminal body 1 to reduce heat radiation.

Specifically, the metal shell layer 21 is arranged to be internally evacuated. The inside of the metal shell layer 21 should be evacuated to below the set vacuum degree to ensure the thermal insulation effect. Optionally, the set vacuum degree is 10-2 Pa.

The terminal thermal insulation shell 2 in an embodiment of the present application adopts a multi-layer thermal insulation structure, and the low temperature radiation protection layer 22 arranged in the metal shell layer 21 can separate the normal temperature metal shell layer 21 from the low temperature cable terminal body 1, effectively reduce the heat loss between the cable terminal body 1 and the outside world such as conduction heat, radiant heat, convection heat dissipation, etc., and make full use of the cooling capacity of the refrigerator to reduce the influence of heat leakage and heat by energization on the high temperature superconducting cable, thereby further improving the reliability of the superconducting cable.

Optionally, the terminal thermal insulation shell 2 comprises a low temperature radiation protection layer bracket 23, which is arranged between the low temperature radiation protection layer 22 and the metal shell layer 21, and is suitable for supporting the low temperature radiation protection layer 22 in the metal shell layer to set a spaced position. In this way, it can effectively avoid the problem of conduction heat leakage caused by the direct contact between the low temperature radiation protection layer 22 and the metal shell layer 21, and reduce heat loss.

Optionally, the low temperature radiation protection layer bracket 23 comprises one or more separation rings 231 arranged between the metal shell layer 21 and the low temperature radiation protection layer 22. The separation rings 231 are supported between the metal shell layer 21 and the low temperature radiation protection layer 22. The entire low temperature radiation protection layer 22 and the metal shell layer 21 are separated by a separation ring 231 to reduce conduction heat leakage.

Optionally, the separation rings 231 are polyvinyl chloride plastic rings, and the separating ring is made of polyvinyl chloride plastic material, and the thermal insulation effect is better.

In an embodiment of the present application, the separation ring structures are arranged between the metal shell layer 21 and the low temperature radiation protection layer 22 to separate the low temperature radiation protection layer 22 from the metal shell layer 21, and the separation rings 231 are polyvinyl chloride plastic rings, which can effectively avoid the heat conduction caused by the direct contact between the low temperature radiation protection layer 22 and the metal shell layer 21 and further reduce the conduction heat leakage and heat loss.

Optionally, as shown in FIGS. 1 to 4, the metal shell layer 21 is provided with a process hole 212 for installing and debugging cables and a process hole cover plate 213 for opening or closing the process hole 212. In the embodiment of the present application, the process hole 212 and the process hole cover plate 213 are provided on the metal shell layer 21, which facilitates the installation and maintenance of cable.

Optionally, the process hole 212 is provided on the top of the metal shell layer 21, and the process hole 212 is a rectangular opening provided along the length direction of the terminal thermal insulating shell 2.

Optionally, the edge of the process hole 212 extends outward to form an interface structure, the edge of the interface structure is provided with a connection flanging, the process hole cover plate 213 is covered on the connection flange, and is fixed on the connection flanging by screw connection.

Optionally, a sealing ring is provided on the process hole cover plate 213, so that an effective seal can be formed after the process hole cover plate 213 is connected to the process hole 212.

Optionally, as shown in FIGS. 1 to 5, the low temperature radiation protection layer 22 is provided with an avoidance opening 8 at a position corresponding to the process hole, and the low temperature radiation protection layer 22 comprises an upper cover body radiation protection layer 221 that can open or close the avoidance openings 8, so a handle 2211 is provided on the radiation protection layer 221 of the upper cover body. This arrangement not only facilitates installation and maintenance operations, but also effectively prevents the loss of cooling capacity in the vacuum insulation chamber. Meanwhile, a handle 2211 is provided on the upper cover body radiation protection layer 221, which is more convenient to open or close the avoidance opening 8.

Optionally, as shown in FIGS. 1 to 4, the terminal thermal insulation shell 2 comprises a cylindrical body 2a, and a cable connection end 2b and an electrical equipment connection end 2c both disposed at both ends of the cylindrical body 2a; a terminal cavity is formed in the cable connection end 2b, the terminal structure further comprises a terminal bracket 5 arranged in the terminal cavity, and the cable terminal body 1 is installed in the terminal thermal insulation shell 2 through the terminal bracket 5.

Optionally, a process hole 212 is opened on the top of the cylindrical body 2a, and the installation sleeve 211 is provided on the bottom of the cylindrical body 2a.

In an embodiment of the present application, the terminal thermal insulation shell 2 comprises a cylindrical body 2a, and a cable connection end 2b and an electrical equipment connection end 2c both disposed at both ends of the cylindrical body 2a, and the terminal bracket 5 is arranged in the cable connection end 2b, both the process hole 212 and the installation sleeve 211 are arranged on the cylindrical body 2a. In this way, the position of each part of the structure in the vacuum thermal insulation cavity is reasonably allocated, so that enough installation and debugging operation space is reserved in the terminal thermal insulation shell 2, and the installation and maintenance cables are more convenient and efficient.

Optionally, as shown in FIGS. 1 to 4 and FIG. 7, the cable connection end 2b comprises a uniform diameter section with a reduced inner diameter, and a variable diameter section connected between the uniform diameter section and the cylindrical body 2a. The terminal bracket 5 comprises a cylindrical bracket body part and a conical bracket body part fitted with the uniform diameter section and the variable diameter section respectively. In an embodiment of the present application, the terminal thermal insulation shell 2 is arranged in the shape of a variable diameter horn to meet the connection and installation of the terminal thermal insulation shell 2 and the cable body thermal insulation sleeve 6, and also provide enough operation space for the installation and debugging of each part of the structure in the terminal thermal insulation shell 2, and the overall structure of the terminal structure is more compact and simple, the cost is reduced, and it is suitable for use and promotion.

Figure 7:
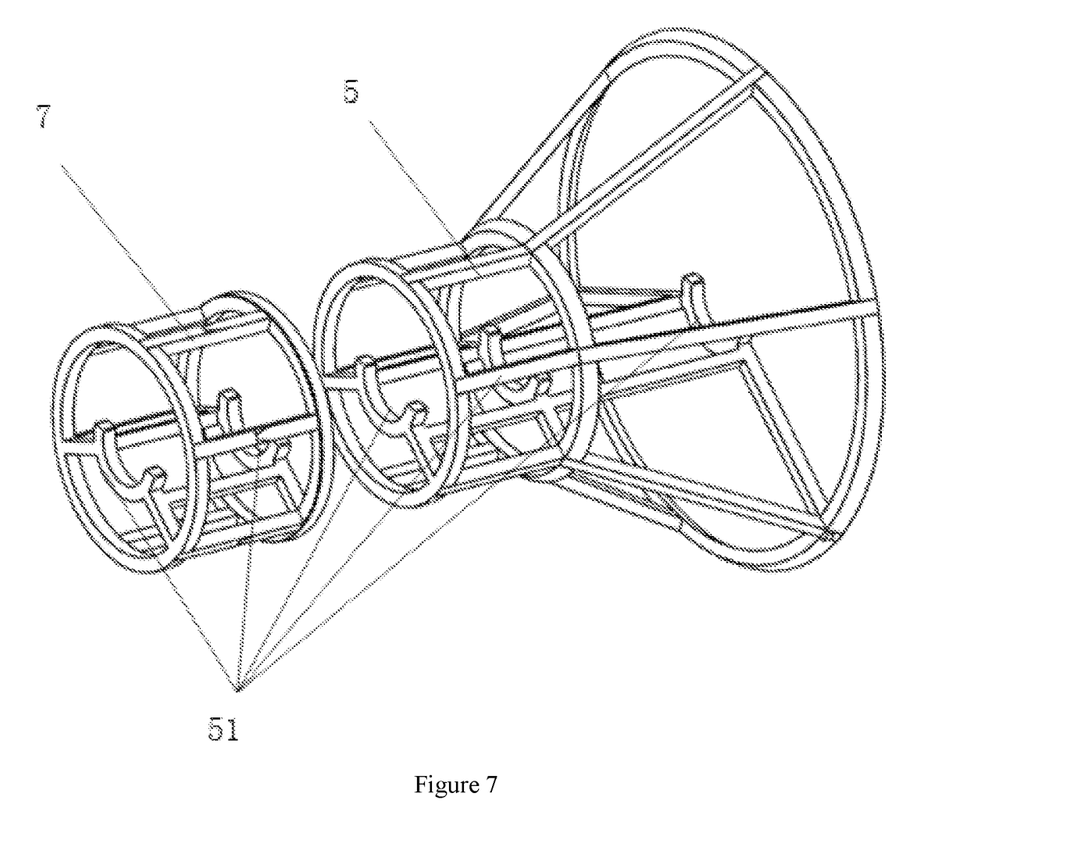
FIG. 7 is a structural view of a terminal bracket and a cable support in an embodiment of the present application.

Optionally, as shown in FIGS. 1, 2 and 7, a plurality of support snap rings 51 for supporting and fixing the cable terminal body 1 are provided spaced apart in the terminal bracket 5 along an axial direction of the terminal bracket 5.

Specifically, the terminal bracket 5 comprises a trumpet-shaped terminal bracket body fitted with the inner circumference of the uniform diameter section and the variable diameter section. The support snap rings 51 comprise an arc snap ring, the inner circumference of the arc snap ring matches the outer circumference of the cable terminal body 1, so as to support the cable terminal body 1 more stably. The support snap ring 51 also comprises a strut that is supported and connected between the arc snap ring and the terminal bracket body, and the arc snap ring is supported and fixed at the center of the terminal bracket 5 by the strut, so as to effectively ensure that the cable terminal body 1 can be in the center position of the terminal thermal insulation shell 2.

Optionally, as shown in FIGS. 1 and 2, the cable terminal body 1 comprises a cable body 11 and a cable joint 12 integrally connected to cable body 11. The cooling-conducting structure 4 is a cooling-conducting belt connected between the refrigeration output part and the cable joint 12 and/or the cable body 11.

Specifically, a cooling-conducting layer is provided on the end of the cable body 11, and the cooling-conducting layer is simultaneously connected between the cooling-conducting layer of the cable body 11 and the cable joint 12.

Optionally, the cold-conducting belt, the cable joint 12 and the cable body 11 are fixed by a strong clamp, for example, a plurality of clamp rings can be used for fixing.

Optionally, as shown in FIGS. 1 to 6, the electrical equipment connection end 2c comprises a connecting plate 2c1 and a terminal post 2c2, the connecting plate 2c1 detachably fixed on the end opening of the cylindrical body 2a; the terminal post 2c2 is arranged on the connecting plate 2c1, the terminal post comprises an inner terminal end 2c21 located on an inner side of the connecting plate 2c1 and an outer terminal end 2c22 located on an outer side of the connecting plate 2c1; the inner terminal end 2c21 is suitable for connecting to the cable joint 12, and the outer terminal end 2c22 is suitable for connecting to electrical equipment. Optionally, the cable joint 12 is connected to the electrical equipment connection end 2c through the current lead 13.

Figure 6:
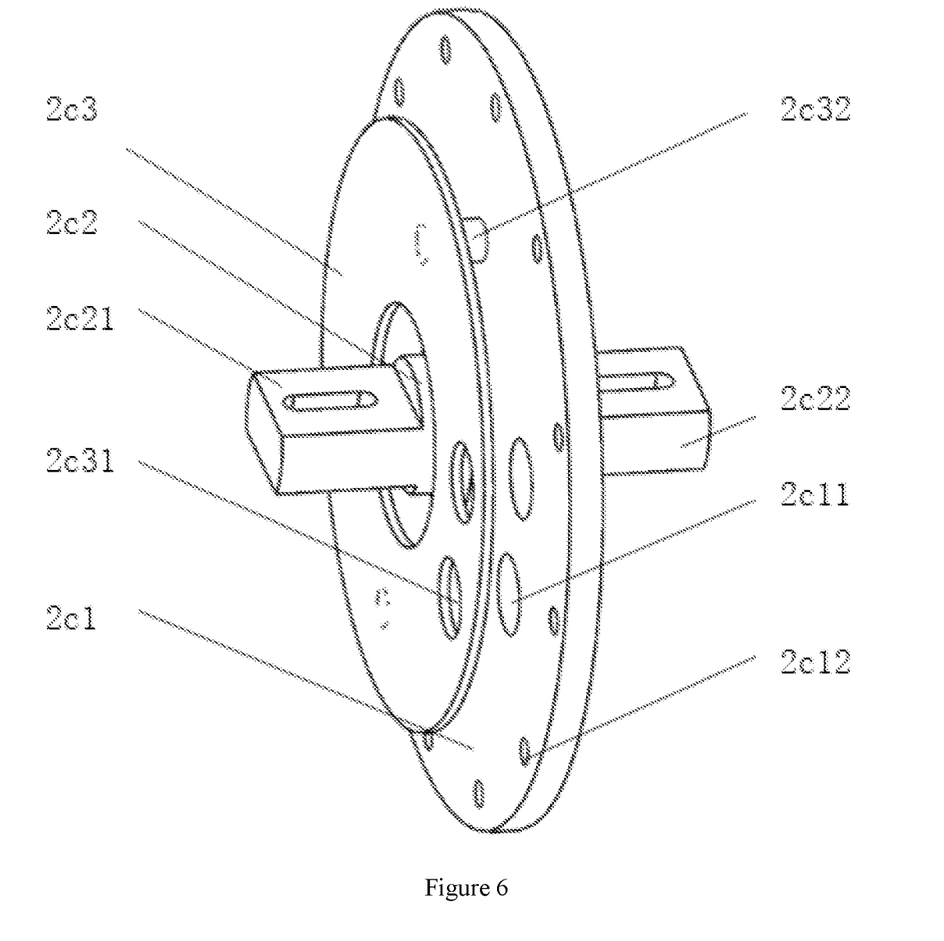
FIG. 6 is a structural view of a connecting plate in an embodiment of the present application.

Optionally, the inner terminal end 2c21 and the outer terminal end 2c22 of the connecting plate 2c1 are respectively provided with bolt grooves, so as to realize the connection between the current lead 13 and the outer terminal of the electrical equipment.

Further, one end of the cylindrical body 2a away from the cable connection end 2b is folded along the center of the circumferential direction and then extends outwardly to form an opening part, the opening part is provided with connecting flanges, and plurality of bolt connection holes 2c12 are arranged spaced apart on the connecting plate 2c1, and the connection flanges are provided with fitting holes correspondingly. The connecting plate 2c1 passes through the bolt connection holes 2c12 and the fitting holes in sequence through bolts, so that the connecting plate 2c1 can be detachably fixed on the cylindrical body 2a.

Preferably, a sealing ring is provided between the connecting plate 2c1 and the connecting flanges to ensure the tightness of the connection between the connecting plate 2c1 and the opening part.

Figure 5:
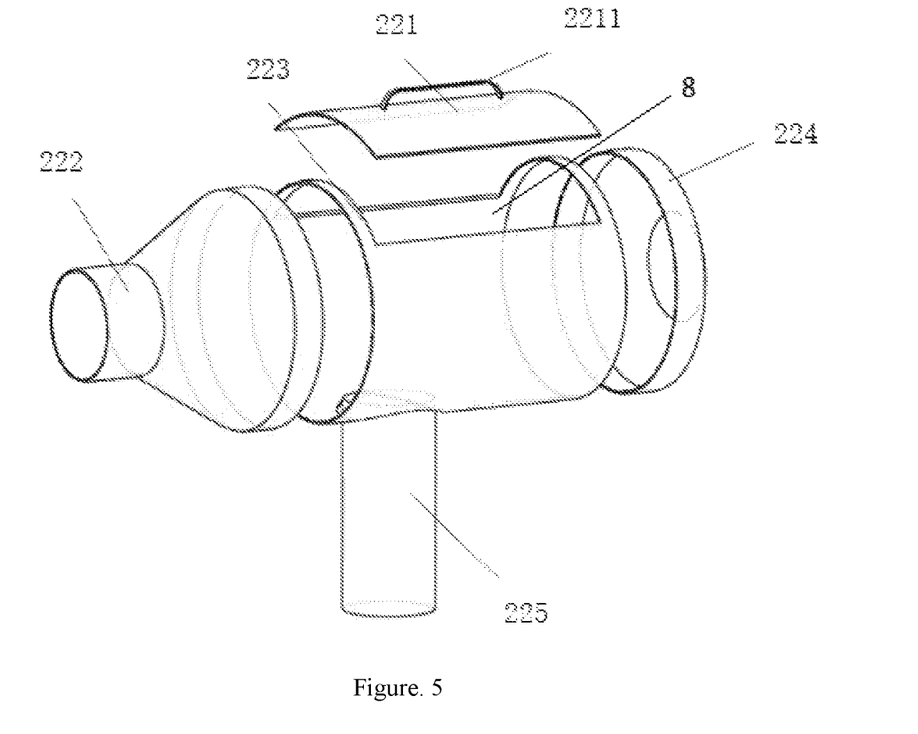
FIG. 5 is a exploded structural view of the low temperature radiation protection layer in an embodiment of the present application before being assembled application.

Optionally, as shown in FIGS. 1 2 and 5, in the embodiment of the present application, the low temperature radiation protection layer 22 in the terminal thermal insulation shell 2 is a split structure with certain flexibility, and is installed in sections in the metal shell layer 21, the low temperature radiation protection layer 22 is divided into five parts, specifically comprising: the radiation protection layer 222 of cable connection end, the radiation protection layer 223 of central cavity, the radiation protection layer 224 of electrical equipment connection end, the radiation protection layer 225 of cold head of refrigerator and the radiation protection layer 221 of upper cover body. The radiation protection layer 223 of central cavity is provided with the avoidance openings 8, and each part is placed in the metal shell layer 21 to determine the position and then adhered and fixed by low temperature aluminized tape to complete the installation. After the installation of each structure of the cable terminal is completed, the radiation protection layer 221 of upper cover body covers the avoidance openings 8 on the radiation protection layer 223 of central cavity to prevent the loss of cooling energy.

Optionally, a temperature strain gauge is further arranged in the vacuum thermal insulation cavity, and the temperature strain gauge is arranged on the tape layer of the superconducting cable. Optionally, during the winding process of the superconducting cable, the temperature strain gauge is attached to the tape layer of the superconducting cable by using low temperature glue, so as to monitor in real time whether the tape temperature of the superconducting cable is in the temperature range in which the superconducting operates. The connecting plate 2c1 is also provided with installation holes 2c11 for installing a vacuum airtight aviation plug, the vacuum airtight aviation plug is sealed and mounted on the installation holes 2c11, and the monitoring lead wire of the temperature strain gauge is connected from the vacuum thermal insulation cavity to the outside of the cavity through the set vacuum airtight aviation plug. so as to ensure that the vacuum in the vacuum thermal insulation cavity does not leak due to the installation of the monitoring lead wire.

Further, the vacuum airtight aviation plug comprises a first connection end extending into the vacuum thermal insulation cavity and a second connection end located outside the vacuum thermal insulation cavity. The first connection end is connected to the monitoring lead wire of the temperature strain gauge, and the second connection end is connected to the temperature strain gauge equipment. In this way, the temperature of the superconducting cable can be effectively monitored and the reliability of the operation of the cable can be ensured.

Optionally, an avoidance installation hole 2c31 is provided on the connecting plate radiation protection screen 2c3 at a position corresponding to the installation hole 2c11, so that the monitoring lead wire is connected to a vacuum airtight aviation plug.

In an embodiment of the present application, the electrical equipment connection end facilitates the installation of elements such as the terminal post 2c2 and the vacuum airtight aviation plug on the connecting plate 2c1 through the detachably arrangement of connecting plate 2c1.

Optionally, the connecting plate 2c1 is a metal plate, and the inner side of the connecting plate 2c1 is provided with a connecting plate radiation protection screen 2c3, and the connecting plate radiation protection screen 2c3 is blocked between the vacuum thermal insulation cavity and the connecting plate 2c1. This arrangement enables the electrical equipment connection end 2c to form effective thermal radiation protection.

Optionally, the low temperature radiation protection layer 22 is provided with an avoidance opening 8 at the position corresponding to the opening part, and the cross-sectional area of the connecting plate radiation protection screen 2c3 is larger than that of the avoidance opening 8, so that the connecting plate radiation protection screen 2c3 is blocked between the avoidance opening 8 and the connecting plate 2c1, the connecting plate radiation protection screen 2c3 is prevented from being smaller than the avoidance opening 8, which cannot play an effective blocking role.

In an embodiment of the present application, the connecting plate radiation protection screen 2c3 is made of the same material as the low temperature radiation protection layer 22.

Optionally, the connecting plate radiation protection screen 2c3 is bonded and fixed to the inner side of the connecting plate 2c1 through a plurality of connecting support columns 2c32 arranged spaced apart, and the connection supporting columns 2c32 are connected and attached to the prefabricated holes of the connecting plate radiation protection screen 2c3 and the connecting plate 2c1 through low temperature metal glue, so as to realize that the connecting plate radiation protection screen 2c3 is supported and fixed on the inner side of the connecting plate 2c1 to set a spaced position. The connecting plate radiation protection screen 2c3, as a part of the connecting plate 2c1, is not installed and bonded with the low temperature radiation protection layer 22 in other parts of the vacuum thermal insulation cavity. Optionally, the connection support column 2c32 is a polytetrafluoroethylene column, the polytetrafluoroethylene column used as the support connection structure for the connecting plate radiation protection screen 2c3 and the connecting plate 2c1 may achieve high strength and low thermal conductivity.

Optionally, an insulating structure is provided between the terminal post 2c2 and the connecting plate 2c1 to avoid electric leakage between the terminal post 2c2 and the connecting plate 2c1. Optionally, the insulating structure is an insulating layer wrapped around the outer periphery of the terminal post 2c2, and the insulating layer can be selected from structures such as an insulating protective sleeve or an insulating protective tube, thereby effectively ensuring the insulation effect between the terminal post 2c2 and the connecting plate 2c1.

In an embodiment of the present application, the overall shape of the metal shell layer 21 is a variable diameter trumpet shape. The cable connection end 2b on the left side of the metal shell layer 21 has a small cross-sectional area, and the other end has a large cross-sectional area; the bottom of the cylindrical body 2a is provided with an installation sleeve for installing the cold head of the refrigerator; the top of the cylindrical body 2a is provided with an square installation process hole 212; and the process hole 212 is used for the installation operation of each structure of the internal cable terminal; the electrical equipment connecting end 2c on the right side of the cylindrical body 2a comprises a connecting plate 2c1 detachably arranged, and the connecting plate 2c1 is provided with a superconducting cable lead-out terminal post 2c2 and a vacuum airtight aviation plug.

Optionally, the terminal structure in an embodiment of the present application further comprises a cable body thermal insulation sleeve arranged on the outer side of the cable body 11, the heat loss such as conduction heat, radiant heat, convection heat dissipation, etc. between the cable body 11 and the outside can be effectively reduced by providing the cable body thermal insulation sleeve 6.

Specifically, the cable body thermal insulation sleeve 6 has a cylindrical structure, the cable body thermal insulation sleeve 6 has a cable body installation cavity inside, the cable body 11 is arranged in the cable body thermal insulation sleeve 6, and the cable body thermal insulation sleeve 6 is connected to the terminal thermal insulation shell 2 in a sealed manner.

Figure 3:
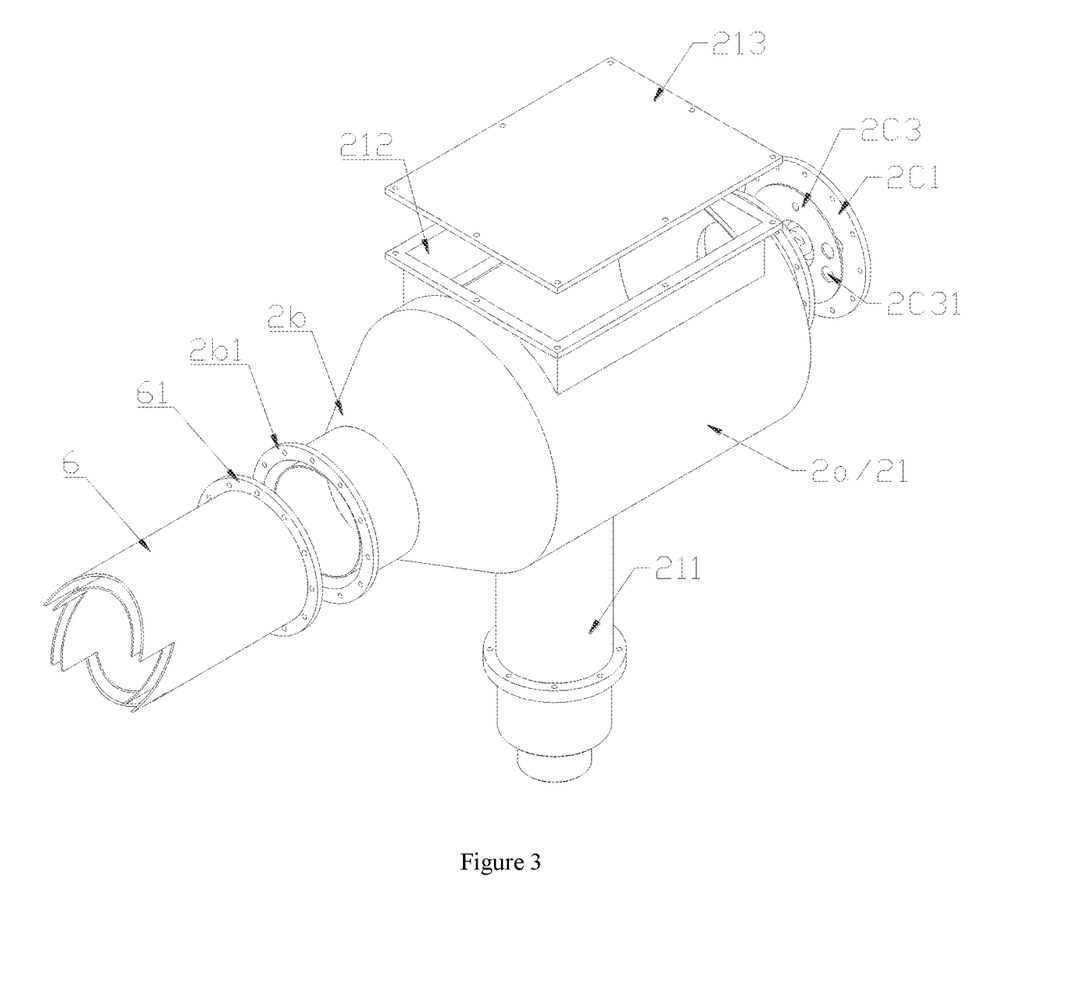
FIG. 3 is an structural view of the terminal thermal insulation shell and the cable body thermal insulation sleeve in an embodiment of the present application.
Figure 4:
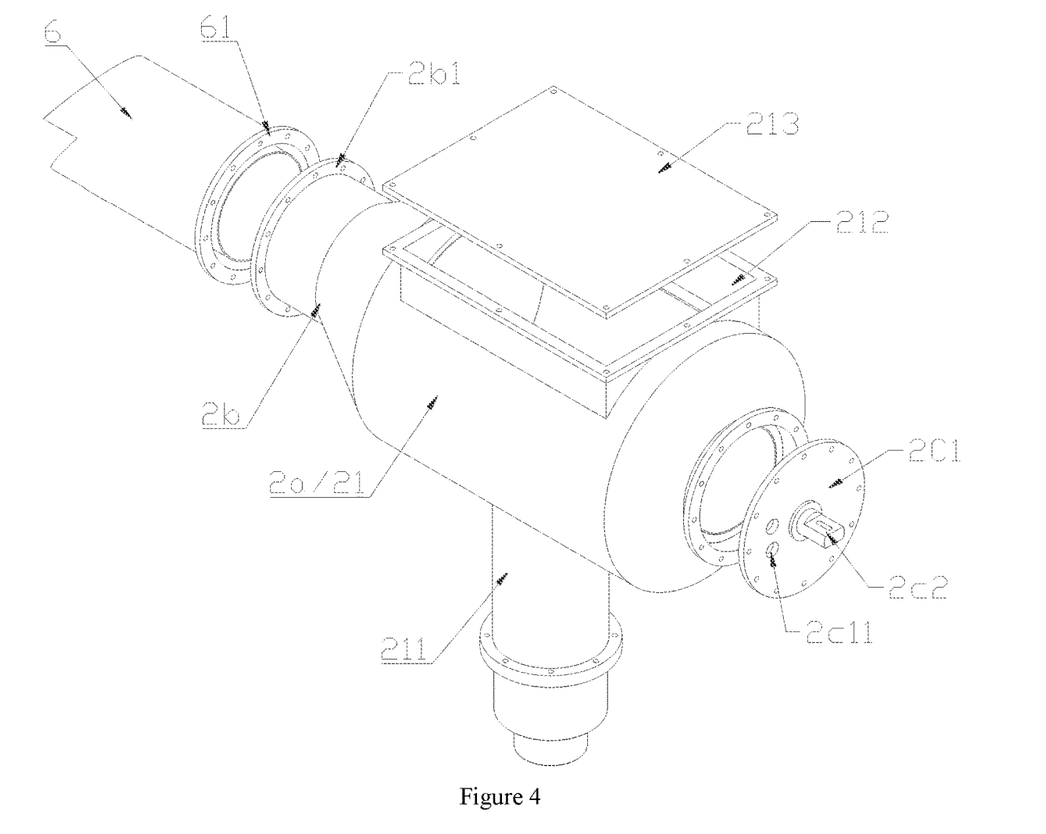
FIG. 4 is another structural view of the terminal thermal insulation shell and the cable body thermal insulation sleeve in an embodiment of the present application.

Further, a first connecting flange 61 is provided at one end of the cable body thermal insulation sleeve 6 connected to the terminal thermal insulation shell 2, and the cable connection end 2b of the terminal thermal insulation shell 2 is correspondingly provided with the second connection flange 2b1 fitted with the first connecting flange 61, the first connecting flange 61 and the second connection flange 2b1 are respectively provided with screw holes, and the first connecting flange 61 and the second connection flange 2b1 are attached and then fixed by screw connection.

Optionally, a sealing ring is arranged between the first connection flange 61 and the second connection flange 2b1 to ensure the sealing performance of the connection between the cable body thermal insulation sleeve 6 and the terminal thermal insulation shell 2.

Optionally, the cable body thermal insulation sleeve 6 has the same structure and material as the terminal thermal insulation sleeve shell 2, and the cable body thermal insulation sleeve 6 also includes the metal shell layer 21 and the low temperature radiation protection layer 22 of the terminal thermal insulation shell 2. The inside of the cable body thermal insulation sleeve 6 is also arranged to be vacuum sealed.

Optionally, the terminal structure described in an embodiment of the present application further comprises a cable support 7, and the cable body 11 is supported and fixed in the cable body thermal insulation sleeve 6 by the cable support 7. The cable support 7 comprises a cylindrical cable support body, and a plurality of support snap rings 51 for supporting the cable body 11 are provided spaced apart in the cable support body. The structure and arrangement of the support snap rings of the cable support 7 are the same as the structure and arrangement of the support snap ring 51 in the terminal bracket 5, and are not repeated here.

Optionally, in an embodiment of the present application, the cable support 7 and the terminal bracket 5 are both made of a support structure completed by riveting and bonding a polytetrafluoroethylene slat with good thermal insulation ability and low thermal conductivity to a circular ring, and each bonding position has a prefabricated riveting groove. After each structure is riveted, low temperature glue is used for fixing.

The connection method of the superconducting cable in an embodiment of the present application is as follows, the superconducting cable is placed on the cable support 7, the cable joint 12 is suspended, the current lead 13 is connected to the cable joint 12 and the inner terminal end 2c21 of the terminal post 2c2 on the connecting plate 2c1. The cooling-conducting belt is connected to the cold head 3 of the refrigerator through a copper end, so as to realize the cooling of the cable body 11 and the cable joint 12 by means of conduction cooling.

An installation step of a terminal structure of a conduction-cooled high-temperature superconducting cable is also provided in an embodiment of the present application as follows:

1) The terminal thermal insulation shell 2 is connected to the cable body thermal insulation sleeve 6, and the cable terminal body 1 passes into the cylindrical body 2a through the variable diameter bell mouth of the cable connection end 2b;

2) A cold head of the refrigerator is installed;

3) A low temperature radiation protection layer bracket 23 is covered along the inner wall of the metal shell layer 21, and the four parts of the low temperature radiation protection layer 22 except the upper cover body radiation protection layer 221 are respectively installed on the low temperature radiation protection layer bracket 23. Each part of the low-temperature radiation protection layer 22 is fixed by a low temperature aluminized tape;

4) The cable bracket 7 and the terminal bracket 5 are installed, and the cable terminal body 1 is placed on the cable bracket 7 and the terminal bracket 5;

5) The lead wire of the temperature strain gauge is welded to the connection port of the vacuum airtight aviation plug;

6) The cooling-conducting tape is installed to the cold head 3 of the refrigerator through bolts, and the current lead 13 is installed to connect the cable joint 12 and the inner terminal end 2c21 on an inner side the connecting plate 2c1;

7) After installing and debugging each element in the vacuum thermal insulation cavity, the upper cover body radiation protection layer 221 is covered and fixed with low temperature adhesive tape to close the process hole 212 of the metal shell layer 21.

Obviously, the above mentioned embodiments are only examples for clear description, and are not intended to limit the implementation. For an ordinary worker in the art, changes or modifications in other different forms can also be made on the basis of the above mentioned description. There is no need and cannot be exhaustive of all implementations here, and the obvious changes or modifications derived from this are still within the protection scope of the present application.

What is claimed is:

1. A terminal structure for conduction cooling high temperature superconducting cable, comprising:
    a cable terminal body;
    a terminal thermal insulation shell, in which a vacuum thermal insulation cavity is formed, and the cable terminal body being arranged in the vacuum thermal insulation cavity; and
    a refrigeration mechanism comprising a refrigeration output part extending into the vacuum thermal insulation cavity, and the refrigeration output part being connected to the cable terminal body through a cooling-conducting structure;
    wherein:
        the refrigeration mechanism comprises a refrigerator; the refrigeration output part is a cold head of the refrigerator, and the cooling-conducting structure is a cooling-conducting belt connected between the cold head of the refrigerator and the cable terminal body; and
        the bottom of the terminal thermal insulation shell is provided with an installation sleeve for receiving and installing the cold head of the refrigerator; the cold head of the refrigerator is installed in the installation sleeve in a sealed manner, and extends into the vacuum thermal insulation cavity from the installation sleeve to be connected to the cooling-conducting belt.

2. The terminal structure for conduction cooling high temperature superconducting cable according to claim 1, wherein:
    the terminal thermal insulation shell is a multi-layer thermal insulation structure, and
    the terminal thermal insulation shell at least comprises:
        a metal shell layer arranged to be internally evacuated; and
        a low temperature radiation protection layer, which is arranged in the metal shell layer and is suitable for separating the metal shell layer and the cable terminal body to reduce heat radiation.

3. The terminal structure for conduction cooling high temperature superconducting cable according to claim 2, wherein the terminal thermal insulation shell comprises:

a low temperature radiation protection layer bracket, which is arranged between the low temperature radiation protection layer and the metal shell layer, and is suitable for supporting the low temperature radiation protection layer in the metal shell layer to set a spaced position.

4. The terminal structure for conduction cooling high temperature superconducting cable according to claim 3, wherein the low temperature radiation protection layer bracket comprises:
   one or more separation rings arranged between the metal shell layer and the low temperature radiation protection layer, and the separation rings are polyvinyl chloride plastic rings.

5. The terminal structure for conduction cooling high temperature superconducting cable according to claim 2, wherein:
   the metal shell layer is provided with a process hole for installing and debugging cables, and a process hole cover plate for opening or closing the process hole.

6. The terminal structure for conduction cooling high temperature superconducting cable according to claim 5, wherein:
   an avoidance opening is provided on the low temperature radiation protection layer at a position corresponding to the process hole; and
   the low-temperature radiation protection layer includes an upper cover body radiation protection layer which is able to open or close the avoidance opening, and a handle is provided on the upper cover body radiation protection layer.

7. The terminal structure for conduction cooling high temperature superconducting cable according to claim 1, wherein:
   the terminal thermal insulation shell includes a cylindrical body, and a cable connection end and an electrical equipment connection end both disposed at both ends of the cylindrical body; and
   a terminal cavity is formed in the cable connection end, the terminal structure further comprises a terminal bracket arranged in the terminal cavity, and the cable terminal body is installed in the terminal thermal insulation shell through the terminal bracket.

8. The terminal structure for conduction cooling high temperature superconducting cable according to claim 7, wherein:
   the cable connection end includes a uniform diameter section with a reduced inner diameter, and a variable diameter section connected between the uniform diameter section and the cylindrical body; and
   the terminal bracket includes a cylindrical bracket body part and a conical bracket body part fitted with the uniform diameter section and the variable diameter section respectively, a plurality of support snap rings for supporting and fixing the cable terminal body are provided spaced apart in the terminal bracket along an axial direction of the terminal bracket.

9. The terminal structure for conduction cooling high temperature superconducting cable according to claim 7, wherein: the cable terminal body includes a cable body and a cable joint; and the cooling-conducting structure is a cooling-conducting belt connected between the refrigeration output part and the cable joint and/or the cable body.

10. The terminal structure for conduction cooling high temperature superconducting cable according to claim 9, wherein the electrical equipment connection end comprises:
    a connecting plate detachably fixed on the end opening of the cylindrical body;
    a terminal post, which is arranged on the connecting plate, and the terminal post comprises an inner terminal end located on an inner side of the connecting plate and an outer terminal end located on an outer side of the connecting plate; and
    the inner terminal end is suitable for connecting to the cable joint, and the outer terminal end is suitable for connecting to electrical equipment.

11. The terminal structure for conduction cooling high temperature superconducting cable according to claim 10, wherein:
    the connecting plate is a metal plate;
    a connecting plate radiation protection screen is arranged on the inner side of the connecting plate; and
    the connecting plate radiation protection screen is blocked, in a sealed manner, between the vacuum thermal insulation cavity and the connecting plate.

12. The terminal structure for conduction cooling high temperature superconducting cable according to claim 9, further comprising:
    a cable body thermal insulation sleeve connected to the terminal thermal insulation shell in a sealed manner; and
    a cable support, through which the cable body is supported and fixed in the cable body thermal insulation sleeve.

* * * * *